(12) United States Patent
Cheney et al.

(10) Patent No.: US 7,950,709 B1
(45) Date of Patent: May 31, 2011

(54) METHOD AND APPARATUS FOR GRIPPING AND INSTALLING PIPE

(75) Inventors: David D. Cheney, Bluffton, OH (US); Joseph E. Cheney, Jenera, OH (US)

(73) Assignee: Orange Township Products L.P.A., Bluffton, OH (US)

( * ) Notice: Subject to any disclaimer, the term of this patent is extended or adjusted under 35 U.S.C. 154(b) by 519 days.

(21) Appl. No.: 12/079,791

(22) Filed: Mar. 27, 2008

(51) Int. Cl.
*B66C 1/62* (2006.01)
(52) U.S. Cl. .................. 294/103.1; 294/88; 294/119.1; 294/902; 414/745.4
(58) Field of Classification Search ............... 294/103.1, 294/119.1, 88, 902, 81.62, 81.54, 67.33; 414/745.4; 405/184.4, 174, 154.1
See application file for complete search history.

(56) References Cited

U.S. PATENT DOCUMENTS

| | | | | |
|---|---|---|---|---|
| 1,807,360 A | * | 5/1931 | Wehr | 294/106 |
| 3,165,347 A | * | 1/1965 | Keskitalo | 294/88 |
| 3,333,717 A | * | 8/1967 | Scaperotto | 414/741 |
| 3,472,401 A | | 10/1969 | Scaperotto | |
| 3,561,615 A | * | 2/1971 | Forsberg et al. | 29/237 |
| 4,310,267 A | | 1/1982 | Davis | |
| 4,403,897 A | * | 9/1983 | Willis | 414/22.55 |
| 4,475,607 A | * | 10/1984 | Haney | 188/67 |
| 4,647,099 A | * | 3/1987 | Berry et al. | 294/103.1 |
| 4,685,837 A | | 8/1987 | Cicanese | |
| 5,365,977 A | * | 11/1994 | Goad et al. | 138/99 |
| 5,388,951 A | | 2/1995 | Tolliver et al. | |
| 6,012,752 A | | 1/2000 | Douglas | |
| 6,568,731 B2 | | 5/2003 | Alexander, III | |
| 7,275,777 B1 | | 10/2007 | Urdiales | |

OTHER PUBLICATIONS

Trench Safety; Version 4.0; This man's life is in danger!;www.trenchsafety.org Sep. 28, 2007.

* cited by examiner

*Primary Examiner* — Dean J Kramer
(74) *Attorney, Agent, or Firm* — Emch, Schaffer, Schaub & Porcello Co., L.P.A.

(57) ABSTRACT

Apparatus for gripping and handling a length of pipe includes first and second pipe gripping members supported on a frame. The first pipe gripping member is movable along a straight line path from an open position to a closed position closer to the second pipe gripping member. The first pipe gripping member is supported on a movable transfer plate having an engagement member connected thereto and to a piston rod of a hydraulic cylinder.

17 Claims, 3 Drawing Sheets

US 7,950,709 B1

METHOD AND APPARATUS FOR GRIPPING AND INSTALLING PIPE

BACKGROUND OF THE INVENTION

The present invention is directed to apparatus for gripping a length of pipe in sizes on the order of 6 to 12 inches in diameter and lengths as long as about 18 to 21 feet and installing such lengths of pipe in a narrow trench on the order of 24 inches in width, without the necessity of a person being in the trench.

In constructing pipelines using lengths of pipe in sizes of the order of those set forth above, it has heretofore been necessary to position a worker in the trench to assist in aligning and installing the length of pipe for joining with a previously laid length of pipe. For purposes of workers' safety, when a worker is working in a trench deep enough to present a cave-in hazard to a worker located in the trench, government regulations require some type of shoring or shielding for preventing cave-in of the trench in the area in which the worker is located. For example, U.S. Pat. No. 4,310,267 discloses a safety trench box and U.S. Pat. No. 4,685,837 discloses a multi-sided portable trench and pit form system for protecting workers in trenches. The use of such shielding or shoring mechanism and the necessity of having a worker in the trench results in significantly higher costs for installation of lengths of pipes than if the pipe lengths could be installed without the necessity of a worker being in the trench.

SUMMARY OF THE INVENTION

Under the present invention, apparatus is provided which can grip lengths of pipe as long as 18 feet for steel and 21 feet for plastic in sizes as great as 12 inches in diameter and hold such length with sufficient rigidity as to permit it being lowered into a trench and manipulated into engagement with a previously installed length of similar pipe without the necessity of having a worker in a the trench to guide the pipe into engagement. The apparatus of the present invention includes a pair of gripping jaws, each having an inwardly facing gripping surface following an arcuate path having a diameter approximating the outside diameter of the pipe and having a length sufficiently long to keep tight control over the length of pipe when being gripped near the center while lowering it into a trench and manipulating it into engagement with the previously laid length of pipe. For example, for pipe lengths on the order of 18 feet for steel and 21 feet for plastic, the length of the gripping jaws should be on the order of 20 to 14 inches and have a rubber or similar surface in close interfacial engagement with the outer surface of the length of pipe. According to the preferred embodiment, one of the gripping jaws is fixed and the other gripping jaw is movable along a straight line path toward and away from the fixed gripping jaw.

It is an object of the present invention to provide apparatus for firmly gripping a length of pipe and to a method for lowering such length into a trench and manipulating it into engagement with a previously laid length without the necessity of a worker being in the trench.

Other objects and advantages of the present invention will become apparent to those skilled in the art upon a review of the following detailed description of the preferred embodiments and the accompanying drawings.

IN THE DRAWINGS

DETAILED DESCRIPTION OF THE INVENTION

Figure 1:
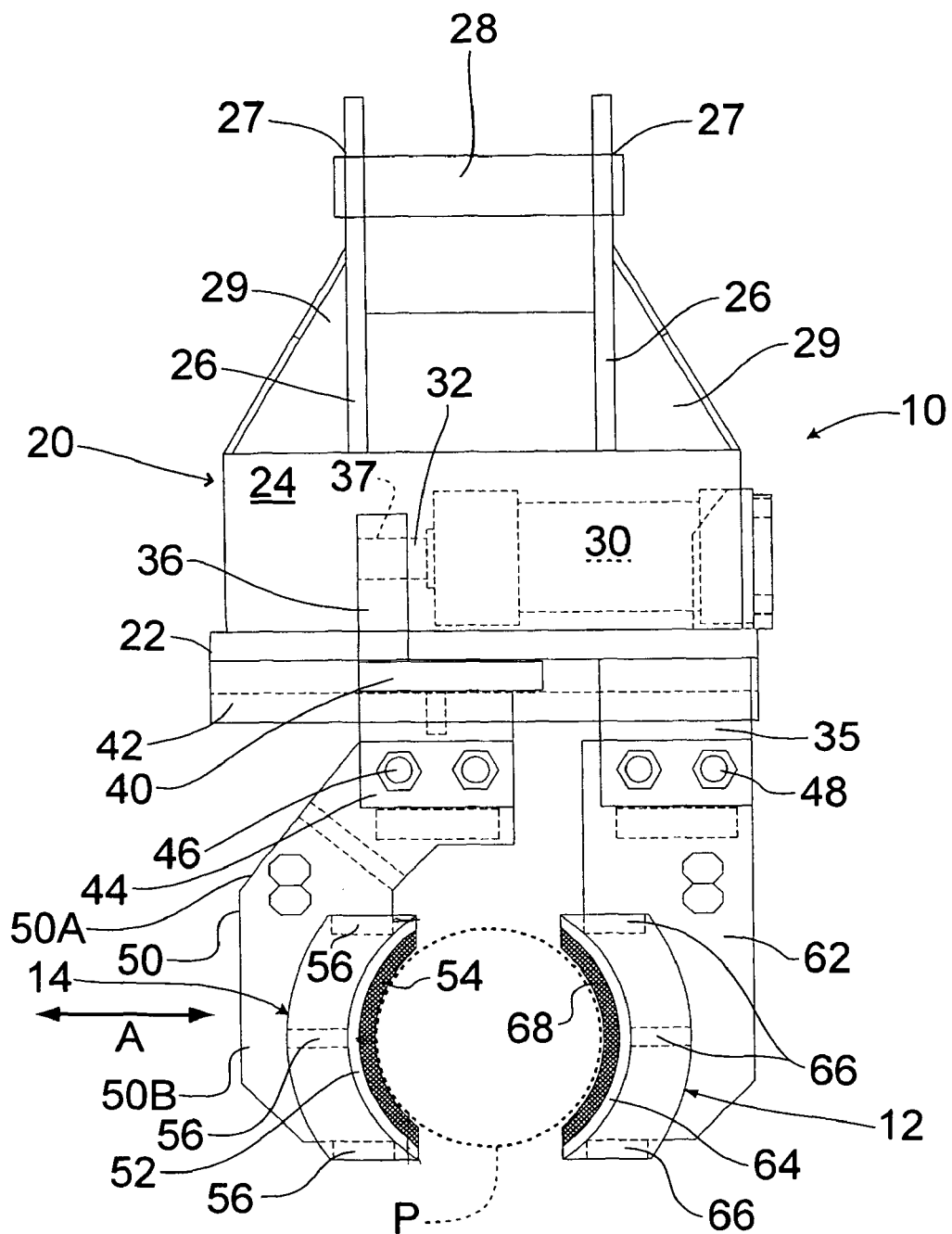
FIG. 1 is an elevational view of the apparatus for gripping and supporting a length of pipe taken from the end.

Referring to the drawings there is shown apparatus generally identified by the numeral 10 for gripping and retaining a length of pipe. The apparatus 10 includes a fixed gripping jaw 12 and a movable gripping jaw 14 which is movable along a straight line path between an open position to a closed or engagement position for engaging a length of pipe P shown in phantom lines in FIG. 1. The fixed gripping jaw 12 and the movable gripping jaw 14 are supported on a frame 20 which includes a support plate 22, a pair of upstanding wall members 24 welded or otherwise fixedly secured to the support plate 22 and a pair of cross plates 26 welded or otherwise fixedly supported on the upstanding wall members 24. The upstanding wall members 24 extend in a direction parallel to the path of movement of the movable gripping jaw 14 as indicated by the arrow A in FIG. 1. The cross plates 26 are parallel to one another and extend in a direction generally perpendicular to the movement of the movable gripping jaw 14 as indicated by the letter A. Each of the cross plates 26 has at its upper end a pair of holes 27. Support bars 28 are fixedly engaged in the respective holes 27 and extend to the respective holes 27 of the opposing cross plate 26 as shown in FIG. 1. The cross bars 28 extend in a direction parallel to that of the upstanding wall members 24 and parallel to the direction of movement indicated by the letter A. Additional support for the cross plates 26 may be had by a pair of struts 29. Each strut 29 is welded or otherwise fixedly secured to the upper edge of the upstanding walls 24 and welded or otherwise fixedly secured on the respective cross plates 26.

Mounted on the support plate 22 is a hydraulic cylinder 30. The hydraulic cylinder 30 includes a cylinder rod 32 which is reciprocal from an extended to a retracted position in a direction parallel to path A. FIG. 1 shows the cylinder rod 32 retracted such that the movable gripping jaw 14 is closed and cooperating with the fixed gripping jaw 12 to snugly and firmly engage a length of pipe P.

The movable gripping jaw 14 is supported on a movable mounting plate 40. The movable mounting plate 40 has engaged thereto an upstanding post 36 having a hole 37 in which the cylinder rod 32 is fixedly positioned. The post 36 extends through a slot 38 in the support plate 22. Support for the movable mounting plate 40 is provided by a pair of flange members 42, each having a vertical aspect 42A which is welded or otherwise fixedly mounted on the support plate 22 and a horizontal aspect 42B on which the movable jaw mounting plate 40 is supported and slidably engaged.

Integrally formed with or welded to the movable jaw mounting plate 40 are a pair of downwardly extending wall members 44 to which the movable gripping jaw 14 may be bolted by a set of nuts and bolts 46. Although it is within the contemplation of the present invention that the movable gripping jaw 14 could be pivotally mounted on the downwardly extending wall members 44 and provided with a mechanism for moving it throughout an arcuate path, it has been found that the apparatus provides exceptionally good gripping and control over the lengths of pipe if the movable gripping jaw 14 is mounted for movement only in a straight line path toward and away from the fixed gripping jaw 12. Accordingly, the movable gripping jaw 14 is affixed to the downwardly extending wall members 44 by at least two sets of nuts and bolts 46. The straight line motion of the movable gripping jaw 14 to a closed position as shown in FIG. 1 upon actuation of the hydraulic cylinder 30, is provided by a structure through which the hydraulic cylinder 30 acts to clamp the movable jaw 14 against the pipe P and the fixed gripping jaw 12 with sufficient force to readily maintain control of such length of pipe P. Additionally, by securing the movable gripping jaw 14 to the downwardly extending wall members 44 by nuts and bolts, it is possible to rapidly change one gripping jaw of a first size, for example a 12 inch pipe engaging jaw to another size, for example an 8 or 10 inch pipe gripping size.

The support structure for the movable gripping jaw 14 includes a pair of arms 50 each of which is fastened to one of the downwardly extending wall members 44 by a pair of the set of the nuts and bolts 46. The arms extend from the downwardly extending wall members 44 initially at an angle on the order of 40° to 60° relative to the plane of the support plate 22 (identified in FIG. 2 as 50A) and an integral second section 50B which is disposed generally perpendicular to the plane of the support plate 22. The arms 50 are spaced apart a distance of at least 7 inches and are welded or otherwise rigidly affixed to a curved plate member 52 to which is secured an inwardly facing rubber gripping member 54. The rubber gripping member 54 lies on a radius approximately one half the diameter of the length of pipe P intended to be gripped so that the rubber gripping member 54 will be snugly and firmly engaged to the outer surface of such length of pipe P. Reinforcing members 56 assist in providing firm support for the curved plate member 52 secured to the arms 50.

The fixed gripping jaw 12 is supported on two spaced apart mounting plates 35 welded to or otherwise rigidly secured to the support plate 22 and its flange members 42. A pair of downwardly extending support arms 62 are fastened, one each to one of the mounting plates 35 by a set of nuts and bolts 48. The support arms 62 extend downwardly along a path generally perpendicular to the plane of the support plate 22. A curved plate 64 is welded or otherwise rigidly fixed to the arms 62. Support members 66 welded to the curved plate 64 and to the arms 62 provide additional support to the curved plate 64. A rubber gripping member 68 secured to the curved plate 64 faces inwardly toward the rubber gripping member 54 of the movable gripping jaw 14. The rubber stripping member 68 follows a curved path similar to that followed by the rubber gripping member 54 so that, when closed, the gripping jaws 12, 14 and their respective rubber gripping members 68, 54 firmly and securely grip the length of pipe P of the size intended to be gripped.

Under a preferred embodiment, it is the inner surface of the curved metal plate member which follows a curved path having a radius substantially equal to one-half the diameter of the length of pipe P to be lifted. The rubber gripping member 54 secured to the inner surface of the curved plate member has a thickness of at least ¼ inch and preferably ⅜ inch to ½ inch. As a result, the radius of curvature of the inner surface of the rubber gripping member 54 will be smaller than one-half the diameter of the length of pipe to be gripped. The resilience of the rubber coupled with the force with which the movable gripping jaw 14 is urged into engagement with the length of pipe P by the hydraulic cylinder 30 results in exceptionally firm gripping control of the pipe P.

Similarly, under such preferred embodiment, it is the inner surface of the curved metal plate 64 of the fixed gripping jaw 12 which follows a curved path having a radius substantially equal to one-half the diameter of the length of pipe P to be lifted. Also, the rubber gripping member 68 secured to the inner surface of the curved plate 64 has a thickness of at least ¼ inch and preferably ⅜ inch to ½ inch. As a result, the radius of curvature of the inner surface of the rubber gripping member 68 will be smaller than one-half the diameter of the lengths of pipe to be gripped.

The length of the respective fixed gripping jaw 12 and movable gripping jaw 14 and their respective curved plates 52, 64, and rubber gripping members 54 and 68 are at least 20 inches. With such lengths, the gripping jaws 12 and 14, when closed and firmly gripping a length of pipe P, have the capability of controlling such length of pipe in a fixed and steady position relative to gripping jaws 12, 14.

Figure 2:
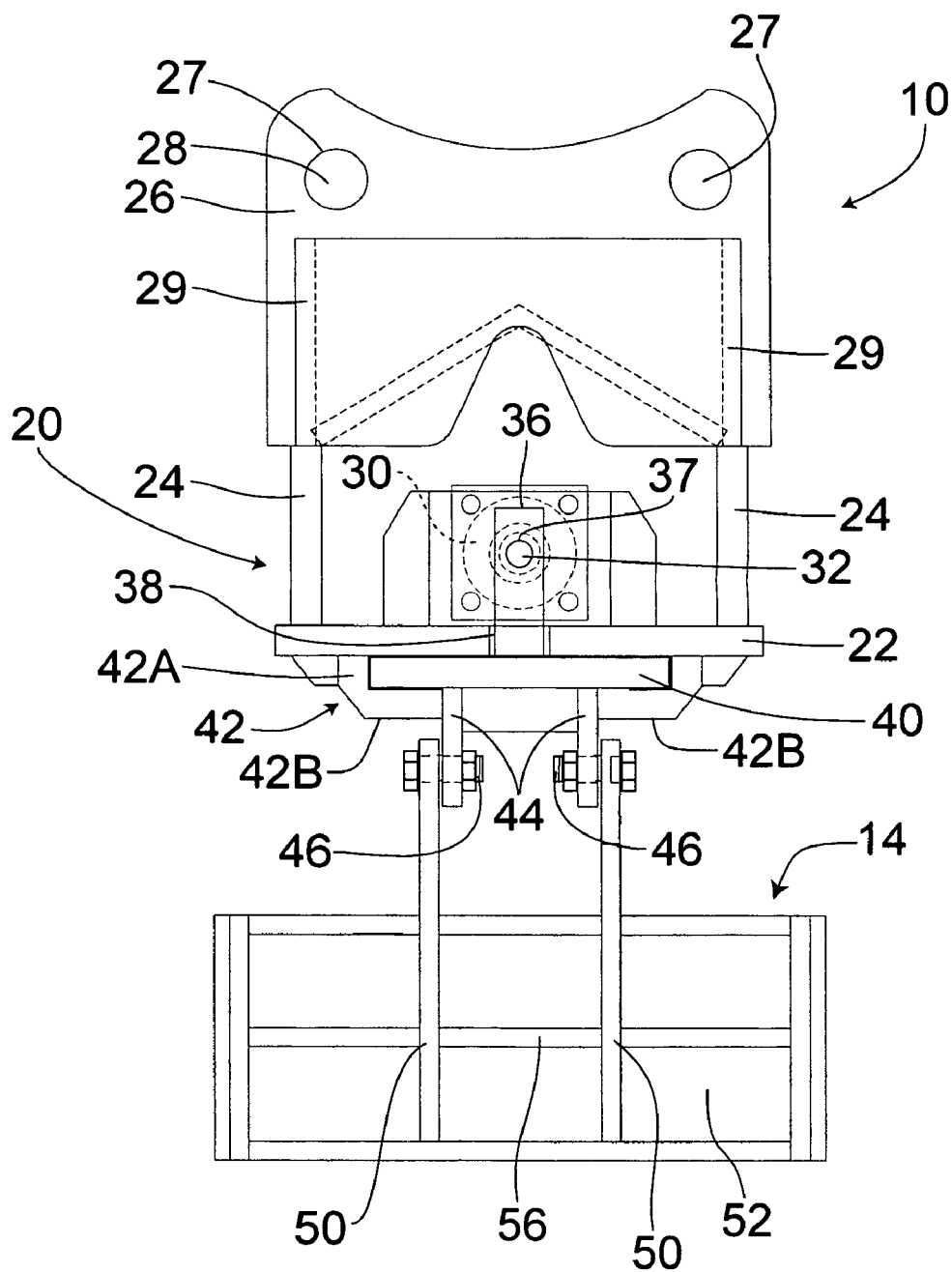
FIG. 2 is an elevational view of the apparatus taken from the left side of FIG. 1.

Additionally, it is within, the contemplation of the present invention that both sets of gripping jaw could be mounted for movement toward and away from each other; however it is preferred that only one of the gripping jaws be movable and the other gripping jaw be fixed as shown in FIGS. 1 and 2 as that requires fewer parts, is less expensive to build and has fewer potential maintenance problems than if both gripping jaws were movable.

Figure 3:
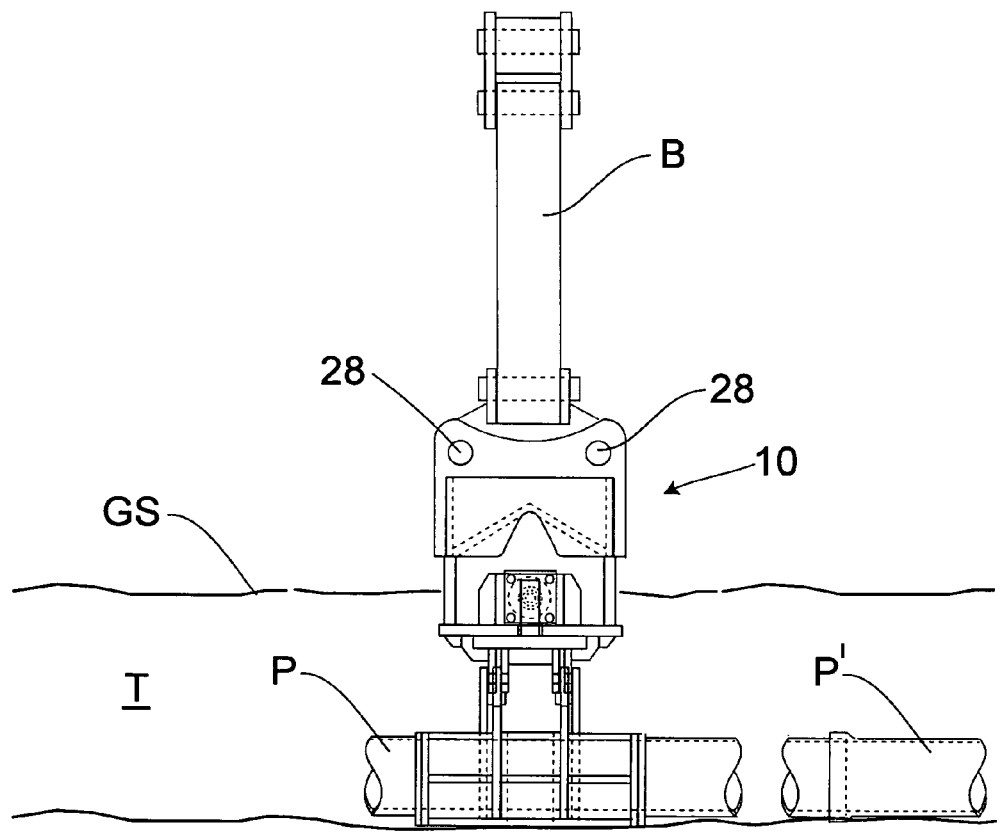
FIG. 3 is a schematic view showing a length of pipe lowered into a trench and engaged to a previously laid length.

In operation, a length of pipe P of the appropriate diameter for the size of gripping jaws 12, 14 is gripped near its center upon actuation of the hydraulic cylinder 30 to move the movable gripping jaw 14 and the assembly secured thereto toward the fixed gripping jaw 12 to firmly engage the outer periphery length of such pipe P between the respective rubber gripping members 54, 68. As shown in FIG. 3 a crane, high loader, or other lifting equipment has a boom B which is engaged to the support bars 28 and lifts the gripped length of pipe P from a position outside of a trench T which has previously been dug, moves the apparatus 10 of the present invention with the gripped length of pipe P to a position overlying the trench in the area where a previously laid length of pipe P' is positioned. The lifting equipment then lowers the apparatus 10 with the length of pipe P firmly engaged between the fixed gripping jaw 12 and movable gripping jaw 14 below ground surface and into the trench and then manipulates the apparatus 10 to slide the gripped length of pipe P into engagement with the previously laid length of pipe P'.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

We claim:

1. Apparatus for gripping and handling a length of pipe extending along an axis and having an outer surface comprising:
   (a) a frame having a support plate;
   (b) a first pipe gripping member supported on and extending downwardly from said frame;
   (c) a second pipe gripping member supported on and extending downwardly from said frame;
   said first and second pipe gripping members cooperating to have (i) a closed position engaging said length of pipe outer surface and (2) an open position for receiving and releasing said length of pipe, said first and second pipe gripping members, when closed around said length of pipe, defining an axis, co-axial with the axis of said length of pipe;
   (d) power means for moving at least one of said first and second pipe gripping members between an open position and a closed position; and
   (e) transfer mechanism connected to said power means and to said one pipe gripping member, said transfer mechanism directing movement of said one pipe gripping member along a straight line path, said power means including a hydraulic cylinder mounted on said support plate and having a cylinder rod movable between a retracted to an extended position and connected to said transfer mechanism, said transfer mechanism including a movable mounting plate (1) supported for movement relative to said support plate and (2) having an upstanding post connected to said cylinder rod.

2. Apparatus for gripping and handling a length of pipe extending along an axis and having an outer surface comprising:
(a) a frame having a support plate;
(b) a first pipe gripping member supported on and extending downwardly from said frame;
(c) a second pipe gripping member supported on and extending downwardly from said frame;
said first and second pipe gripping members cooperating to have (i) a closed position engaging said length of pipe outer surface and (2) an open position for receiving and releasing said length of pipe, said first and second pipe gripping members, when closed around said length of pipe, defining an axis, co-axial with the axis of said length of pipe;
(d) power means for moving at least one of said first and second pipe gripping members between said open position and said closed position; and
(e) transfer mechanism connected to said power means and to said first pipe gripping member, said transfer mechanism directing movement of said first pipe gripping member along a straight line path perpendicular to said axis,
said power means including a hydraulic cylinder mounted on said support plate and having a cylinder rod movable between a retracted to an extended position and connected to said transfer mechanism, said transfer mechanism including a movable mounting plate (1) supported for movement relative to said support plate; and (2) having an upstanding post connected to said cylinder rod, said support plate having a pair of flanges facing inwardly toward one another, said mounting plate resting upon and slidable relative to said flanges.

3. Apparatus according to claim 2 further including support structure maintaining said second pipe gripping member in a fixed position on said frame.

4. Apparatus according to claim 2 wherein said support plate has an elongated slot, said upstanding post extending through and movable in said slot.

5. Apparatus according to claim 2 wherein each of said first and second pipe gripping members has a pipe engagement face contoured such that substantially the entire face, upon gripping said length of pipe, is in interfacial engagement with said pipe.

6. Apparatus according to claim 5 wherein each said pipe engagement face is formed of rubber or other non-metallic material.

7. Apparatus according to claim 5 wherein each of said pipe gripping members have a length parallel to the axis of the pipe to be gripped of at least 20 inches.

8. Apparatus according to claim 5 wherein each said pipe gripping face has an arcuate contour with a radius in the range of 3 inches to 6 inches.

9. In combination:
(A) a length of pipe extending along an axis and having length of at least 10 feet and an outer surface with a diameter in the range of 6 to 12 inches; and
(B) apparatus gripping said length of pipe comprising:
(a) a frame having a support plate;
(b) a first pipe gripping member supported on and extending downwardly from said frame:
(c) a second pipe gripping member supported on and extending downwardly from said frame;
said first and second pipe gripping members cooperating to have (i) a closed position engaging said length of pipe outer surface and (2) an open position for receiving and releasing said length of pipe, said first and second pipe gripping members, when closed around said length of pipe, defining an axis, co-axial with the axis of said length of pipe;
(d) power means for moving at least one of said first and second pipe gripping members between on open position and a closed position; said power means including a hydraulic cylinder mounted on said support plate and having a cylinder rod movable between a retracted to an extended position; and
(e) transfer mechanism connected to said power means and to said one pipe gripping member, said transfer mechanism directing movement of said one pipe gripping member along a straight line path perpendicular to said axis said transfer mechanism includes a movable mounting plate (1) supported for movement relative to said support plate; and (2) having an upstanding post connected to said cylinder rod, said support plate having a pair of flanges facing inwardly toward one another, said mounting plate resting upon and slidable relative to said flanges.

10. The combination according to claim 9 further including a support structure maintaining the other of said pipe gripping member in a fixed position on said frame.

11. The combination according to claim 9 wherein said support plate has an elongated slot, said upstanding post extending through and movable in said slot.

12. The combination according to claim 9 wherein each of said first and second pipe gripping members has a pipe engagement face contoured such that substantially the entire face, upon gripping said length of pipe, is in interfacial engagement with said pipe.

13. The combination according to claim 12 wherein each said pipe engagement face is formed of rubber or other non-metallic material.

14. The combination according to claim 12 wherein each of said pipe gripping members have a length parallel to the axis of the pipe to be gripped of at least 20 inches.

15. The combination according to claim 14 wherein each of said pipe gripping members includes:
(a) a curved metal plate having an arcuate contour with a radius equal to substantially one-half the diameter of said length of pipe; and
(b) a non-metallic gripping member secured to said curved metal plate and engaged to said length of pipe.

16. The combination according to claim 15 wherein said non-metallic gripping member is rubber having a thickness in the range of ¼ inch to ½ inch.

17. The combination according to claim 12 wherein each said pipe gripping face has an arcuate contour with a radius in the range of 3 inches to 6 inches.

* * * * *